United States Patent [19]

Carvalho et al.

[11] Patent Number: 5,161,948
[45] Date of Patent: Nov. 10, 1992

[54] PROPULSOR PITCHLOCK AND FEATHER STOP

[75] Inventors: Paul A. Carvalho, Westfield; Edward H. Kusiak, Longmeadow, both of Mass.

[73] Assignee: United Technologies Corporation, Hartford, Conn.

[21] Appl. No.: 738,376

[22] Filed: Jul. 31, 1991

[51] Int. Cl.⁵ .................. B64C 11/32; B64C 11/38
[52] U.S. Cl. ................................ 416/46; 416/154; 416/157 R
[58] Field of Search .............. 416/154, 156, 157 R, 416/46

[56] References Cited

U.S. PATENT DOCUMENTS

| | | | |
|---|---|---|---|
| 2,542,463 | 2/1951 | Beard | 416/157 |
| 2,632,516 | 3/1953 | Longfellow | 416/46 |
| 2,663,373 | 12/1953 | Richmond | 416/46 |
| 2,855,057 | 10/1958 | Van Alstyne | 416/46 |
| 3,175,620 | 3/1965 | Newton | 416/46 |
| 3,212,586 | 10/1965 | Barnes et al. | 170/160.24 |
| 3,645,644 | 2/1972 | Schwisow | 416/157 |
| 3,936,226 | 2/1976 | Harner et al. | 416/28 |
| 4,523,891 | 6/1985 | Schwartz et al. | 416/157 R |
| 4,753,572 | 6/1988 | Kusiak | 416/46 |

Primary Examiner—Edward K. Look
Assistant Examiner—Michael S. Lee
Attorney, Agent, or Firm—William W. Habelt

[57] ABSTRACT

A pitch change actuation system for changing the pitch of the blades (16) of a prop-fan propulsor (10) comprises a translating pitch change actuator (30) and a flexible feather latch member (50) including a feather stop (56) and a feather latch (58), the feather latch member (50) being selectively releasable so as to permit the pitch change actuator (30) to drive the blades (16) through feather to a desired reverse pitch setting. Pitchlock lugs (96) and (98) operatively engage a pitchlock screw lug (97) on a pitchlock screw (80) to provide pitchlock screw stops at full reverse pitch and feather, respectively, with the pitchlock lug (98) being selectively displaceable so as to permit the pitchlock screw (80) to rotate when the pitch change actuator (30) is translated to drive the blades (16) through feather to reverse pitch.

5 Claims, 5 Drawing Sheets

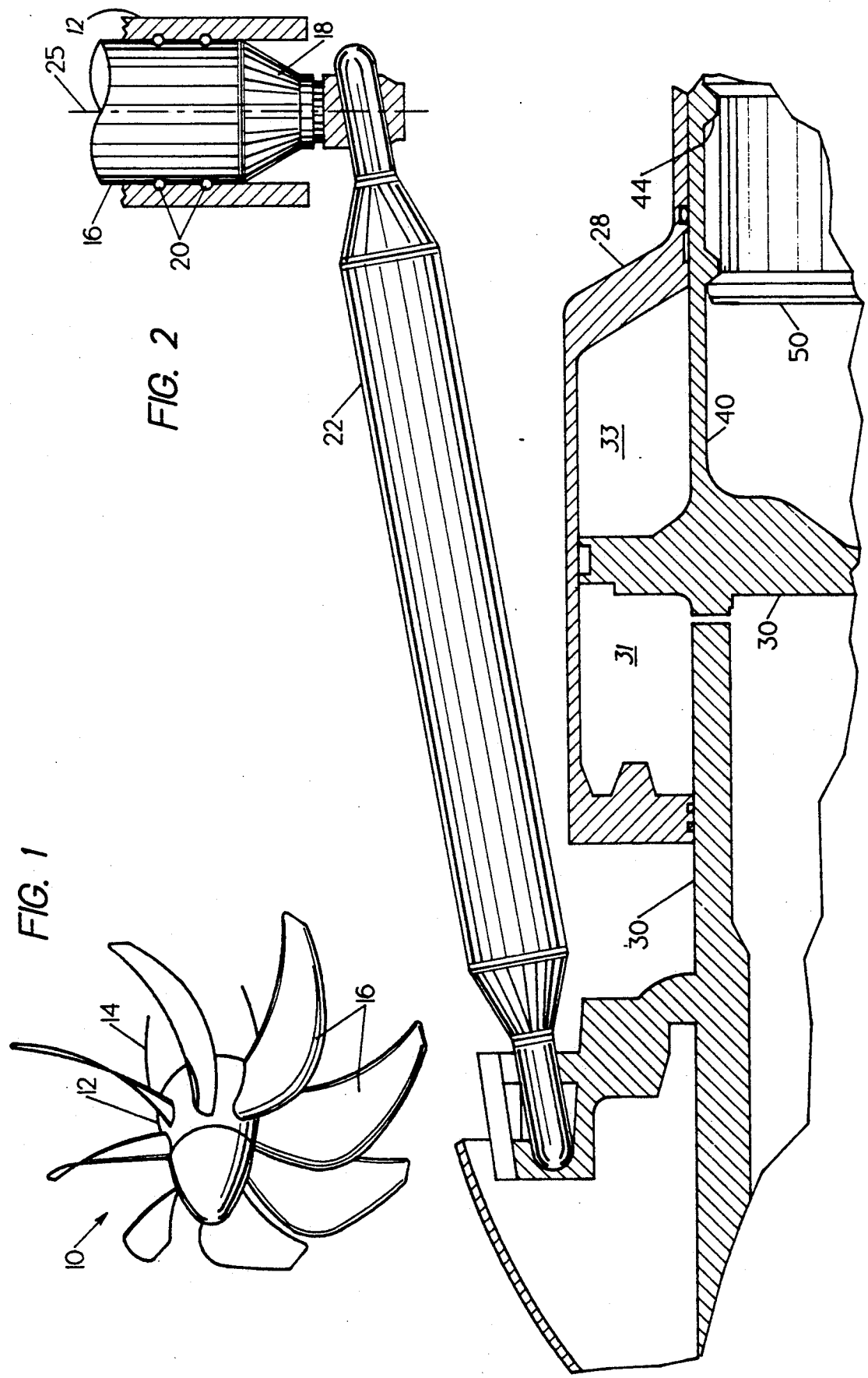

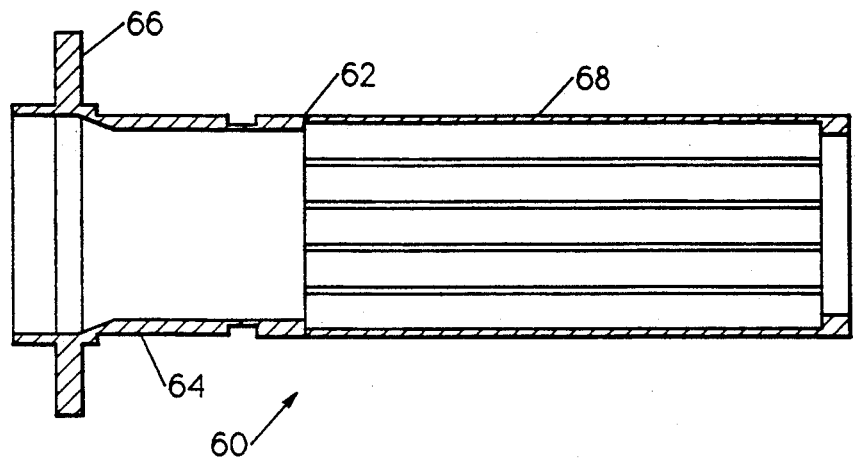
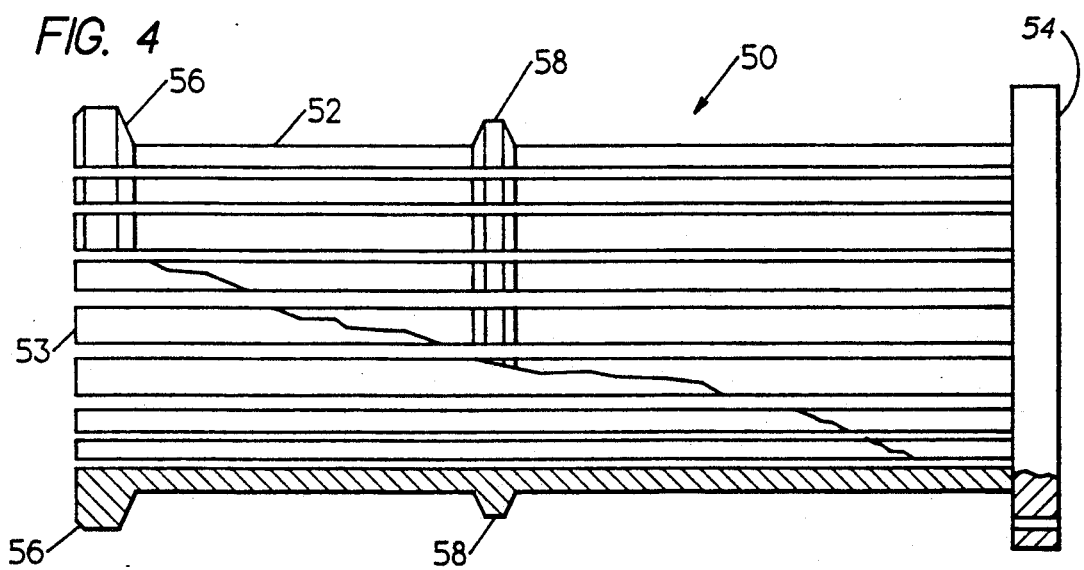

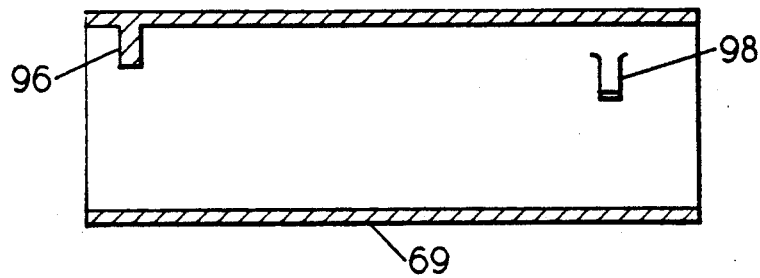
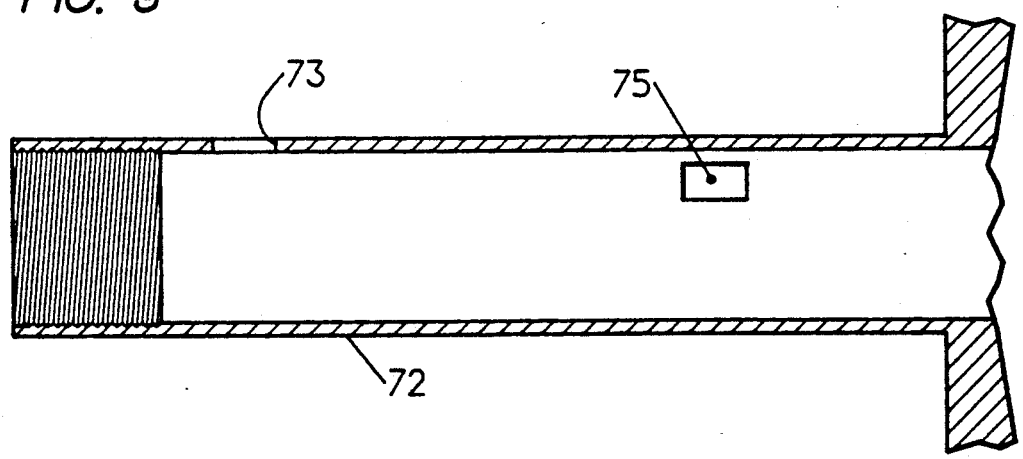

PROPULSOR PITCHLOCK AND FEATHER STOP

TECHNICAL FIELD

This invention relates generally to variable pitch propulsor systems and, more particularly, to blade pitch change actuation systems for variable pitch propeller, prop-fan, and unducted or ducted fan systems for powering aircraft.

BACKGROUND ART

In typical variable pitch propulsor systems, a plurality of propulsor blades, each rotatably mounted for movement about its longitudinal axis to a rotary hub driven by the aircraft engine, are operatively connected to a mechanical or hydromechanical blade pitch change actuation system disposed in an interior chamber defined within the hub. As well recognized by those skilled in the art, it is necessary in such blade pitch change actuation systems to provide a pitchlock for maintaining blade pitch in the event of a malfunction in the system's hydraulic supply and also an end of stroke stop to prevent the blades from inadvertently going to a coarse pitch setting outside of the operating range.

An example of a hydromechanical blade pitch change actuation system that is equipped with a mechanical pitchlock and an end of stroke stop is presented is commonly assigned U.S. Pat. No. 4,523,891, to Schwartz and Duchesneau. In the pitch change actuation system disclosed therein, commonly known as a linear hydromechanical actuation system, pitchlock is provided by maintaining a relatively small pitchlock gap between the forward end of a pitchlock screw threadably mounted within a bulkhead of the pitch change actuation piston and a stop extending from the hub wall into its interior. At any pitch setting, the pitchlock screw is positioned relative to the pitch stop such that the pitch change actuation piston cannot translate toward fine pitch without the pitchlock screw quickly traversing the relatively small pitchlock gap and grounding against the pitch stop thereby precluding any further movement of the actuation piston towards fine pitch.

Passage through feather is precluded in this system by means of a radially directed stud which extends outwardly from an aft portion of the pitchlock screw and a cooperating feather stop which extends axially from the central bulkhead of the piston through which the pitchlock screw is threaded. As the pitch change actuation piston translates rearwardly towards maximum coarse pitch, the feather stop moves rearwardly therewith until it is engaged by the stud on the rotating pitchlock screw. Upon such engagement, further rotation of the pitchlock screw is physically impossible and further translation of the pitch change actuation piston is consequently precluded, thus preventing jamming of the pitchlock screw when the actuator has reached the end of its stroke and placed the propeller blades in feather.

Conventionally, propeller blades are passed through low pitch when it is desired to set the blades to a desired reverse pitch. A hydromechanical pitch control system having a fine pitch stop which may be released to permit the propeller blades to pass through low pitch to reverse pitch is disclosed in commonly-assigned U.S. Pat. No. 3,212,586. In the pitch control system disclosed therein, pivoting stop fingers engage lugs associated with the pitch change actuator to limit fine pitch movement of the blades to a preselected low pitch setting during normal operation. The pivoting fingers are operatively connected to a spring loaded, hydraulic piston which may be selectively actuated via hydraulic fluid pressure to translate against the spring force so as to pivot the stop fingers out of engagement with the pitch change actuator, thereby permitting the actuator to drive the blades through the low pitch limit setting to a desired reverse blade pitch.

While performing its functions satisfactorily on such conventional propeller systems, such a pitch change actuator would be unsuitable for use on a system wherein blade pitch is reversed by passing the blades through feather, rather than flat pitch, such as required on variable pitch propulsors having a large number of blades, such as state-of-the-art turbofans being considered for use on turbine driven aircraft, since the feather stop prevents the actuator from passing the blades through feather.

DISCLOSURE OF INVENTION

It is an object of the present invention to provide a pitch change actuation system which permits reversing blade pitch when desired by passing the blades through feather, but prevents inadvertent blade reversal during flight.

It is a further object of the present invention to provide a pitch change actuation system having a retractable feather stop.

It is an additional object of the present invention to provide a pitch change actuation system having an overrideable feather latch in addition to a retractable feather stop.

It is also an object of the present invention to provide a pitch change actuation system having a soft pitchlock screw stop at both the feather position and full reverse positions.

According to the present invention, a pitch change actuation system having a translating pitch change actuator for changing blade pitch on a variable pitch propulsor, such as a propeller blade or fan blade, and a feather stop means for engaging the pitch change actuator to limit coarse pitch movement of the blades to a preselected feather pitch, i.e. maximum coarse pitch, during normal operation, is characterized in that the feather stop means is selectively releasable so as to permit the pitch change actuator to drive the blades through feather pitch to a desired reverse pitch setting. Additionally, the pitch change actuation system of the present invention may include a rotating pitchlock screw and a pitchlock means operatively associated therewith for selectively engaging the pitchlock screw to limit its rotation, the pitchlock means being selectively positionable so as to operatively engage the pitchlock screw at both the blade feather position and the desired reverse blade pitch setting.

The foregoing and other objects, features and advantages of the present invention will become more apparent in light of the detailed description of a best mode embodiment thereof, as illustrated in the accompanying drawing.

BRIEF DESCRIPTION OF DRAWING

FIG. 1 is a perspective view of a variable pitch prop-fan propulsor system;

FIG. 2 is a partially sectioned, side elevational view of the hub assembly of the variable pitch prop-fan propulsor system incorporating the pitch change actuation system of the present invention;

FIG. 4 is a perspective view of the feather latch and stop member of the pitch change actuation system as illustrated in FIG. 3;

FIG. 7 is a perspective view of the annular support piston of the pitch change actuation system as illustrated in FIG. 3 including a slotted sleeve torsion spring;

FIG. 8 is a perspective view of the inner cylindrical sleeve supported in the annular support piston of the pitch change actuation system as illustrated in FIG. 3; and FIG. 9 is a perspective view of the generally cylindrical inner leg of the support member of the pitch change actuation system as illustrated in FIG. 3.

BEST MODE FOR CARRYING OUT THE INVENTION

The pitchlock and feather stop assembly of the present invention is particularly suited for use in a system for adjusting the pitch of the blades of a variable pitch propulsor system of the type suitable for use on propulsor driven aircraft, such as, but not limited to, a prop-fan propulsor as depicted in FIG. 1. The prop-fan propulsor 10 comprises a rotatable hub 12 having a plurality of circumferentially spaced, radially extending, variable pitch prop-fan blades 16 mounted thereto for rotation therewith. The rotatable hub 12 is operatively connected in a conventional manner to and driven by an engine, typically a turbine engine, (not shown) mounted in nacelle 14.

Figure 3:
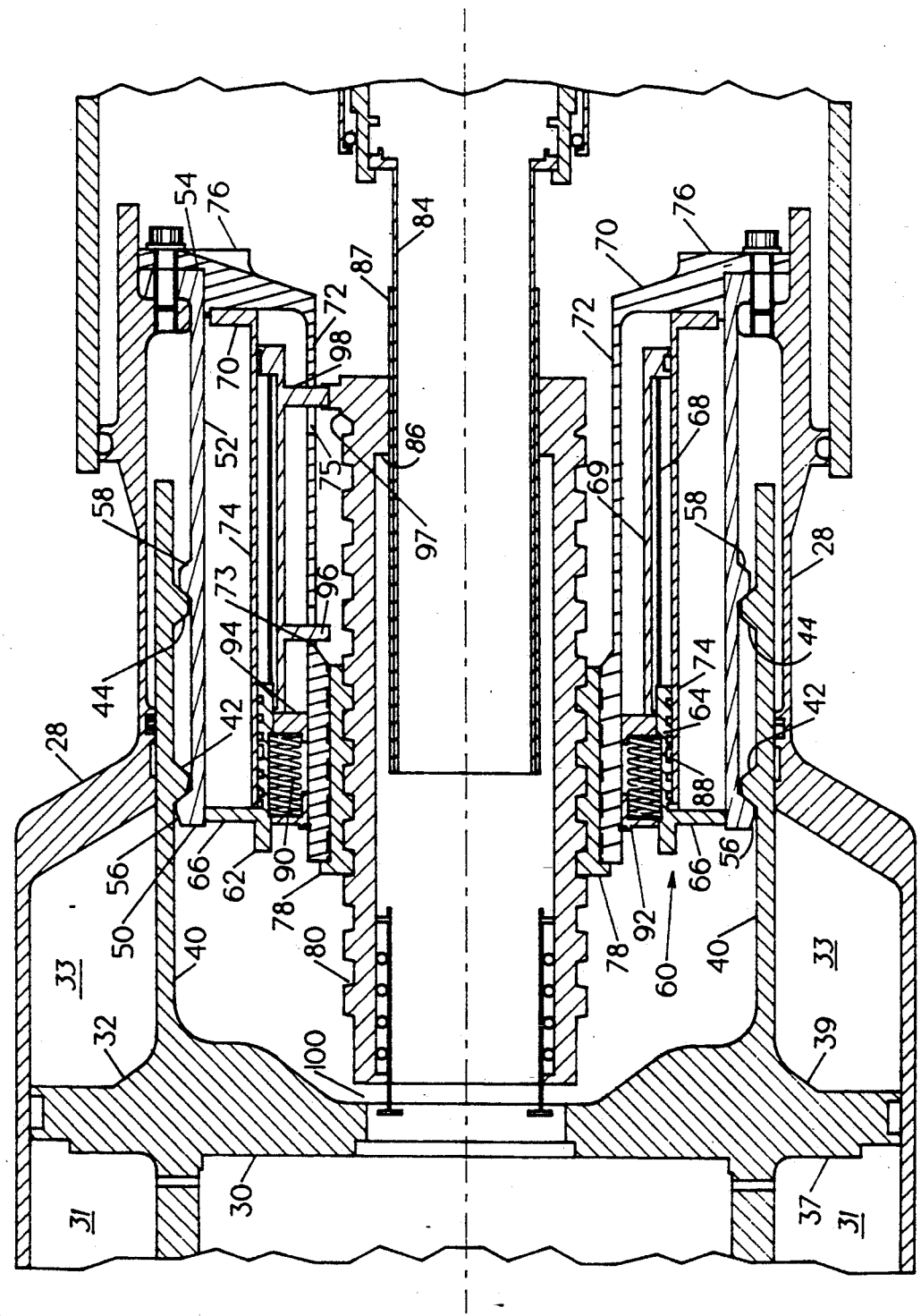
FIG. 3 is a sectional side elevational view of a portion of FIG. 2 illustrating the pitch change actuation system of the present invention when the blades are locked in the feather position.

Referring now to FIGS. 2 and 3, each of the blades 16 is mounted at its root portion 18 on bearings 20 in a socket of the hub 12 so as to be pivotally adjustable for pitch change about a longitudinal axis 25. Each blade 16 is operatively connected in a conventional manner via a connecting arm 22 to a pitch change actuator 30 which is disposed within a chamber defined within the interior region of the hub 12. The pitch change actuator 30 comprises an axially reciprocal, hydraulically actuated piston 32 disposed within a rotating housing 28 which rotates with the propeller hub 12. To effectuate a change in blade pitch, hydraulic fluid is selectively ported either to the forward fluid chamber 31 or the aft fluid chamber 33, and drained from the other, by conventional techniques, such as for example a metering valve and torque tube assembly (not shown) operatively associated with the pitch change actuator 30, the particular means for supplying hydraulic fluid not being germane to the invention. When hydraulic fluid is directed into the forward fluid chamber 31 and drained from the aft chamber 33, a fluid pressure force is applied to the forward face 37 of the actuator piston 32 thereby driving the piston 32 and the connecting arms 22 associated therewith axially rearward thereby causing a rotation of the blades 16 to a finer pitch, i.e. a lower pitch. Conversely, when hydraulic fluid is directed into the aft fluid chamber 33 and drained from the forward fluid chamber 31, a fluid pressure force is applied to the rearward face 39 of the actuator piston 32 thereby driving the piston 32 and the connecting arms 22 associated therewith axially forward thereby causing a rotation of the blades 16 to a coarser pitch, i.e. a greater pitch.

Extending coaxially rearwardly from the rearward face 39 of the actuator piston 32 of the pitch change actuator 30 is an axially elongated cylindrical sleeve 40 which translates with the piston 32 along a surrounding cylindrical wall portion of the housing 28. Protruding radially inwardly from the inner wall of the cylindrical piston sleeve 40 are a first annular rib 42 and a second annular rib 44, which are disposed in axially spaced relationship with the first annular rib 42 located forward of the second annular rib 44. As will be explained in further detail hereinafter, the forward annular rib 42 and the rearward annular rib 44 function in operative cooperation with the flexible latch member 50 as a feather stop surface and a feather latch surface, respectively.

The flexible latch member 50 comprises a slotted sleeve 52 which is mounted at its base end via an outwardly extending flange 54 to the rotating housing 28 and, as best seen in FIG. 4, has a plurality of circumferentially arrayed, flexible fingers 53 extending coaxially from its base end in cantilevered fashion into the internal cavity defined within the annular piston sleeve 40 in juxtaposition therewith. Protruding radially outwardly from the outer surface of each finger 53 of the cantilevered sleeve portion 52 of the annular latch member 50 is a first annular shoulder 56 and a second annular shoulder 58, disposed in axially spaced relationship with the first annular shoulder 56 located at the forward distal end of each finger 53 and the second annular shoulder 58 located rearwardly thereof. The forward annular shoulder 56 and the aft annular shoulder 58 are axially spaced such that when the blades 16 are in the feather position, the piston sleeve 40 and the latch member 50 are positioned in registration, the forward annular shoulder 56 and the aft annular shoulder 58 of the latch member 50 flank the forward rib 42 and aft rib 44, respectively, of the piston sleeve 40. So positioned, the forward shoulder 56 is disposed forward of and in abutting relationship with the forward rib 42 so as to form a feather stop, and the rearward shoulder 58 is disposed rearward of and in abutting relationship with the aft rib 44 so as to form a feather latch.

In accordance with the present invention, there is provided a selectively positionable locking means 60 which may be positioned relative to the flexible feather latch sleeve 52 so as to bias the forward shoulder 56 at the distal end of the flexible feather latch sleeve 52 radially outwardly against the actuator piston sleeve 40. With the locking means 60 so positioned, the forward rib 42 protruding from the piston sleeve 40 cannot move past the feather stop shoulder 56 of the latch sleeve 52, but rather stops in abutting relationship against the forward shoulder 56 thereby arresting and precluding further forward motion of the pitch change actuator 30, thus preventing the blades operatively connected thereto from passing through feather. However, when the locking means 60 is released, that is selectively displaced so that the feather latch sleeve 52 is no longer biased against the piston sleeve 40, but rather may now flex, the forward rib 42 passes over the feather stop shoulder 56 as the pitch change actuator 30 translates forward, thus permitting the blades to pass through feather to reverse pitch when so desired.

Figure 5:
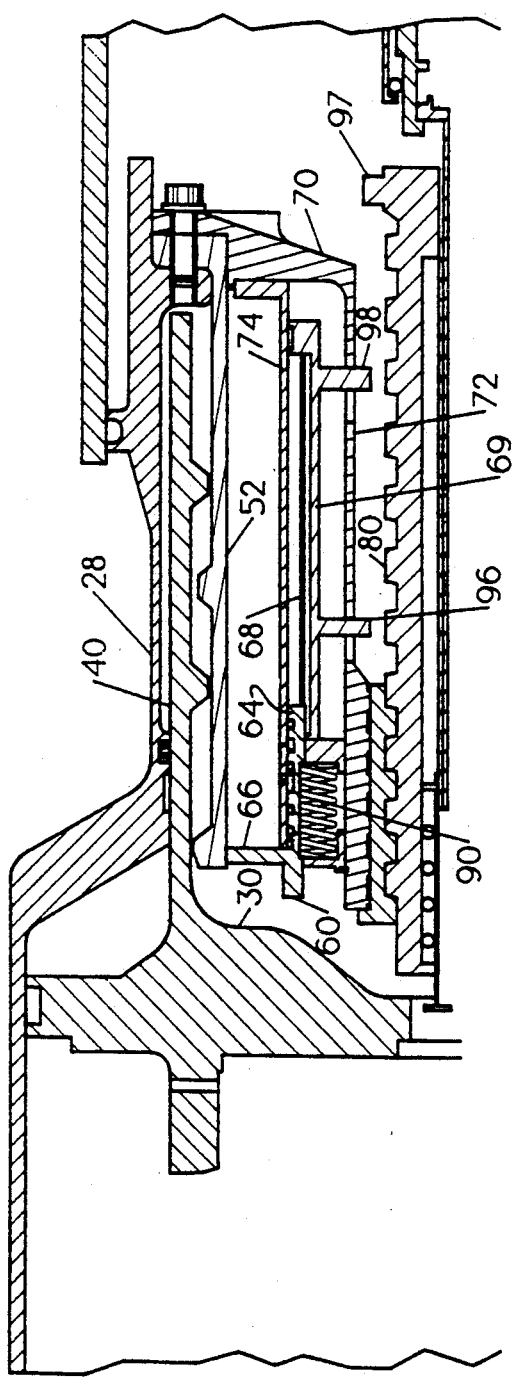
FIG. 5 is a sectional side elevational view of the pitch change actuation system of FIG. 3 when the blades are in normal cruise operation.
Figure 6:
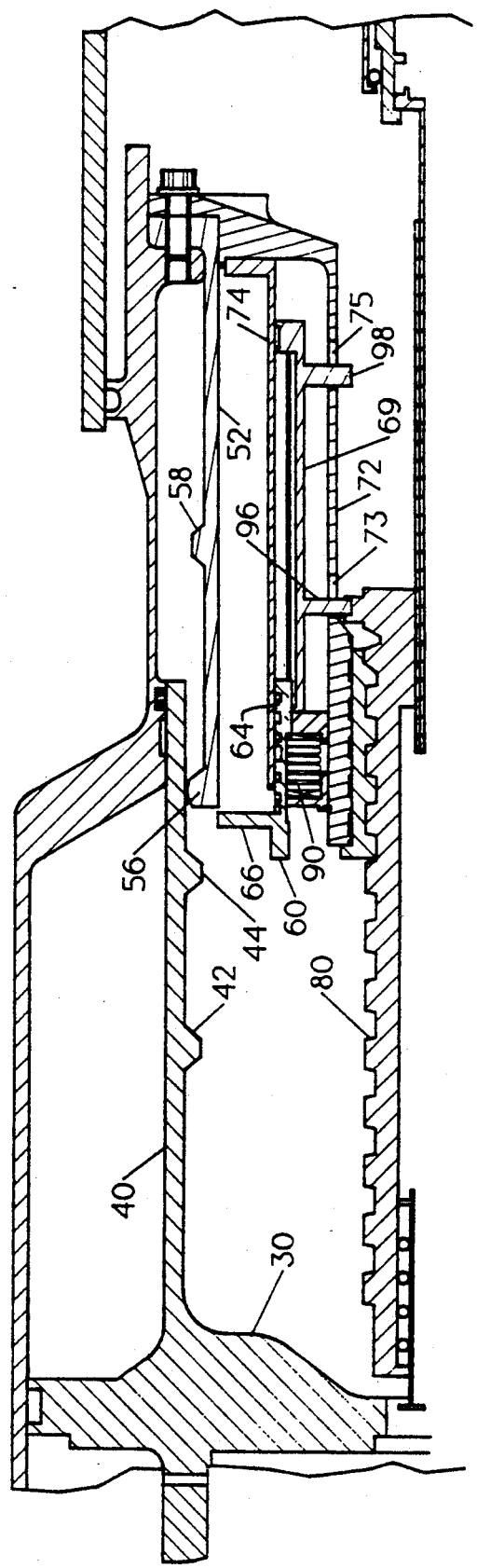
FIG. 6 is a sectional side elevational view of the pitch change actuation system of FIG. 3 when the blades are set at reverse pitch.

The locking means 60 comprises an axially translatable support piston 62 which is selectively positionable so as to lock the feather latch member 50 in position during cruise as illustrated in FIG. 5 or to release so as to permit the feather latch member 50 to flex thereby allowing the actuator 30 to translate past the feather stop 56 to a reverse pitch setting as illustrated in FIG. 6. As best seen in FIG. 7, the support piston 62 comprises an annular piston sleeve 64, an annular flange 66 that extends radially outward from the annular sleeve 64 to contact the flexible latch member 50 when the support piston 62 is positioned in locking position, and a slotted sleeve portion 68 extending axially from the annular piston sleeve 64 and supporting an inner cylindrical sleeve 69. The annular piston sleeve 64 and slotted sleeve portion 68 of the support piston 62 are disposed coaxially within the interior of the annular feather latch member 50 between an inner annular leg 72 and an outer annular leg 74 of the assembly support member 70 and is axially displaceable along the radially outer leg 74 thereof.

Depending radially inwardly from the inner cylindrical sleeve 69 of the support piston 62, as best seen in FIG. 8, are a pair of axially spaced, circumferentially offset pitchlock lugs 96 and 98, which, as will be discussed further hereinafter, function pitchlocks, the lug 96 being a pitchlock when the blades 16 are set at the full reverse pitch setting and the lug 98 being a pitchlock when the blades 16 are set at the feather pitch setting. The slotted sleeve portion 68 of the support piston 62 serves as a torsion spring means for absorbing the shock load on the pitch change actuation system when either of the lugs 96 and 98 operatively engages a lug 97 on a pitchlock screw 80 thereby acting as a pitchlock and precluding further rotation of the pitchlock screw 80.

The assembly support member 70 comprises a flange-like hip portion 76 which is mounted to the rotating housing 28 and extends generally radially inwardly therefrom to connect with the inner and outer legs 72 and 74, each of which comprises a generally cylindrical coaxially extending, radially spaced members. As best seen in FIG. 9, the generally cylindrical inner leg 72 has provided therein two axially spaced, circumferentially offset openings 73 and 75 through which the lugs 96 and 98, respectively, depending from the sleeve 69 pass. Mounted to the distal end of the radially inner leg 72 is a cylindrical foot 78 which has a radially inner surface which is threaded so as to receive a pitchlock screw 80. Advantageously, the cylindrical foot 76 comprises a screw nut and the pitchlock screw 80 comprises a conventional acme screw.

Juxtaposed between the support piston 62 and the distal end of the radially inner leg 72 is bias spring means comprising a plurality of circumferentially arrayed, axially extending springs 90 confined between axially spaced annular spring support rings 92 and 94 disposed about the inner leg 72 of the support member 70. Each spring 90 is disposed about a guide pin which is axially translatable with the support ring 94 operatively associated with the piston sleeve 64. The bias spring means 90 acts against the flange 94 so as to bias the support piston 62 into a locking position with respect to the feather latch member 50. That is, the bias springs continuously exert an axially rearwardly directed force on the piston sleeve 64 so as to continuously bias the support piston in an axially rearward direction.

In this manner, it is ensured that the support sleeve 64 is retained in locking position against the feather latch member 50 unless sufficient hydraulic pressure is supplied to the fluid chamber 88 of the support piston 62 at a pressure sufficient to generate enough force acting on the piston 62 so as to overcome the rearwardly directed force of the bias spring means 90 on the support piston 62 thereby translating the support piston 62 axially forwardly along the radially outer leg 74 so as to move the support sleeve 64 of the locking means 60 from out of engagement with the feather latch member 50 thereby releasing the feather stop rib 42 on the piston sleeve 40 of the pitch change actuator 30 thus permitting the pitch change actuator 30 to translate forwardly and drive the propeller blades past feather, i.e., maximum blade pitch, to reverse pitch setting.

When it is desired to release the feather stop and drive the propeller blades through feather to reverse pitch, hydraulic fluid is selectively ported to the fluid chamber 88 so as to overcome the rearwardly directed force of the bias spring means 90 to translate the support sleeve 64 sufficiently forwardly to bring it out of engagement with the feather latch member 50. With the support flange 66 no longer in engagement with the feather latch member 50, the flexible annular sleeve 52 flexes as the feather stop rib 42 presses against the forward shoulder 56 of the feather latch member 50 and a sufficient force is supplied by the hydraulic fluid being selectively supplied to the aft fluid chamber 33 of the pitch change actuator 30, the feather stop rib 42 passes over the forward shoulder 56 of the feather latch member 50 thereby permitting the pitch change actuator 30 to drive the blades through maximum blade pitch to the desired reverse pitch setting. Conversely, when it is desired that the locking means 60 be repositioned in engagement with the feather latch member 50, fluid is selectively drained from the fluid chamber 88 of the support piston 62 and the rearwardly axially directed force exerted by the bias spring means 90 upon the flange 94 drives the support piston 62 axially rearwardly until the support member 66 is brought in engagement with the feather latch member 50.

As noted hereinbefore, a pair of axially spaced, circumferentially offset pitchlock lugs 96 and 98 depend radially inwardly from the inner cylindrical sleeve 69 of the support piston 62, as best seen in FIG. 8. The lug 96 functions as a pitchlock when the blades 16 are set at the full reverse pitch setting and the lug 98 functions as a pitchlock when the blades 16 are set at the feather pitch setting. When either the forward pitchlock lug 96 or the aft pitchlock lug 98 is engaged by the radially outwardly directed lug 97 on the pitchlock screw 80, relative rotation between the pitchlock screw 80 and the actuator piston 32 of the pitch change actuator 30 is precluded and a minimum pitchlock gap 100 is provided therebetween thus preventing the pitchlock screw 80 from impacting and becoming jammed against the pitch change actuator 30. The slotted sleeve portion 68 of the support piston 62 serves as a torsion spring means for absorbing the shock load on the pitch change actuation system when either of the lugs 96 and 98 operatively engages the lug 97 on the pitchlock screw 80 so as to preclude further rotation of the pitchlock screw 80 and thereby provides an elastic stop at both the full reverse pitch setting and the feather pitch setting.

When the pitchlock screw lug 97 is not engaging either the forward pitchlock lug 96 or the aft pitchlock lug 98 depending from the piston sleeve 64 through the openings 73 and 75 in the radially inner leg 72 of the assembly support member 70, the pitchlock screw 80 may be driven in rotation relative to the pitch change actuator 30 through rotation of the drive shaft 84 which is transmitted to the pitchlock screw via a conventional quill and spline arrangement such as quills 86 extending radially inwardly from the pitchlock screw 80 to engage splines 87 provided on the outer surface of the drive shaft 84. To release the feather pitchlock screw stop when it is desired to move the blades 16 through feather to reverse pitch, the lug 98 is moved out of engagement with the lug 97 of the pitchlock screw 80 by selectively supplying hydraulic fluid to the fluid chamber 88 of the support piston 62 so as to translate the support piston sufficiently to release the engagement between the lug 98 and the lug 97.

The pitchlock and releasable feather stop assembly of the present invention may be used with either a mechanical type pitch change actuator, for example a conventional translatable ball nut threaded on a rotatable ball screw of the type disclosed in commonly-assigned U.S. Pat. No. 4,753,572, or a hydromechanical type pitch change actuator, for example a piston and torque tube arrangement of the type disclosed in commonly-assigned U.S. Pat. No. 4,523,891. Although the pitchlock and releasable feather stop assembly of the present invention has been herein described in application to a hydromechanical type pitch change actuator, it is to be understood that the particular type of pitch change actuator utilized not being germane to the pitchlock and releasable feather stop assembly of the present invention.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A pitch change actuator system for changing blade pitch on a variable pitch propeller having a hub and a plurality of blades, each blade mounted to the hub for rotation about its longitudinal axis to effect a change in blade pitch, said system comprising:
   a translating pitch change actuator operatively interconnected to each of the blades whereby axial translation of said pitch change actuator results in a rotation of each of the blades so as to effect a change in blade pitch; and
   feather stop means for engaging said pitch change actuator to preclude the blades from passing beyond feather during normal operation, said feather stop means being selectively releasable so as to permit said pitch change actuator to drive the blades through feather to a desired reverse pitch, said feather stop means comprising:
   an elongated flexible member mounted at one end to the hub and extending therefrom in cantilevered fashion and having a first annular shoulder protruding radially outwardly from the cantilevered end of said member and a second annular shoulder protruding radially outwardly therefrom at a location axially spaced from said first annular shoulder, said first annular shoulder providing a feather stop and said second annular shoulder providing a feather latch; and
   locking means for holding said first annular shoulder in engagement with said pitch change actuator so as to preclude said pitch change actuator from driving the blades through feather when said locking means is selectively positioned in a first locking position relative to said flexible member, said locking means being selectively positionable in a second release position relative to said flexible member whereby said pitch change actuator may pass over said first annular shoulder to drive the blades through feather to the desired reverse pitch.

2. A pitch change actuator as recited in claim 1 further characterized in that said locking means comprises:
   an axially translatable piston having an axially disposed annular sleeve portion and an annular flange extending radially outwardly from the sleeve portion to abut against said flex latch member when said locking means is positioned in the first locking position; and
   spring means operatively associated with said piston for imposing a bias force against said piston to hold said locking means in the first position; said piston being selectively fluid actuated to compress said bias spring means sufficiently to overcome the bias force and translate said locking means from the first locking position to the second release position.

3. A pitch change actuator as recited in claim 2 further characterized by:
   a pitchlock screw coaxially disposed within the sleeve portion of said piston, said pitchlock screw being rotatable about its axis; and
   pitchlock means for preventing the rotation of said pitchlock screw when engaged therewith, said pitchlock means translating axially with said piston and being selectively positionable to engage said pitchlock screw at both the feather position and a maximum reverse pitch position of the blades.

4. A pitch change actuator system as recited in claim 3 further characterized in that said piston comprises an annular support member and a cylindrical sleeve extending axially therefrom, said cylindrical sleeve having a plurality of circumferentially spaced axially elongated slots cut therein whereby said slotted sleeve functions as torsion spring means for absorbing energy when said pitchlock means engages said pitchlock screw at the feather position or at the maximum reverse pitch position of the blades.

5. A pitch change actuator system as recited in claim 3 further characterized in that said flexible feather latch member of said feather stop means has a second annular shoulder protruding radially outwardly therefrom at a location axially spaced from said first annular shoulder.

* * * * *